United States Patent [19]

Lowe et al.

[11] 4,381,323

[45] Apr. 26, 1983

[54] LOW-TEMPERATURE CURING COATING COMPOSITION

[75] Inventors: Jean C. Lowe, Lansdale; James M. Klotz, Quakertown, both of Pa.; Glenn A. Collins, Jr., deceased, late of Lansdale, Pa., by Jean C. Lowe, executrix

[73] Assignee: Coatings for Industry, Inc., Souderton, Pa.

[21] Appl. No.: 358,384

[22] Filed: Mar. 15, 1982

Related U.S. Application Data

[60] Division of Ser. No. 144,013, Apr. 28, 1980, Pat. No. 4,319,924, which is a continuation-in-part of Ser. No. 931,674, Aug. 7, 1978, abandoned, which is a continuation of Ser. No. 677,495, Apr. 15, 1976, abandoned, which is a continuation of Ser. No. 441,887, Feb. 12, 1974, abandoned.

[51] Int. Cl.$^3$ .................................................. B05D 3/02
[52] U.S. Cl. .............................. 427/383.7; 427/376.5; 427/376.6; 427/383.3; 148/6.16
[58] Field of Search ............... 106/14.12, 14.15, 14.17, 106/14.21, 1.12, 1.13, 1.14, 1.19, 1.25; 148/6.16; 427/383.3, 383.7, 376.3, 376.5, 376.6

[56] References Cited

U.S. PATENT DOCUMENTS

| | | | |
|---|---|---|---|
| 2,737,498 | 3/1956 | Frasch | 148/6.16 |
| 2,768,104 | 10/1956 | Schuster et al. | 148/6.16 |
| 3,248,249 | 4/1966 | Collins | 106/286 |
| 3,248,250 | 4/1966 | Collins | 106/286 |
| 3,248,251 | 4/1966 | Allen | 106/286 |
| 3,706,603 | 12/1972 | Vessey et al. | 146/6.2 |
| 3,706,604 | 12/1972 | Plaxton | 148/6.16 |
| 3,717,509 | 2/1973 | Palm et al. | 148/6.16 |
| 3,720,549 | 3/1973 | Hirst et al. | 148/6.16 |
| 3,819,425 | 6/1974 | De Ridder et al. | 148/6.16 |
| 3,840,392 | 10/1974 | Schuster | 148/6.16 |

*Primary Examiner*—Shrive P. Beck
*Attorney, Agent, or Firm*—John T. Synnestvedt; Alexis Barron

[57] ABSTRACT

A coating composition which is capable of being used effectively in a wide variety of applications where heretofore known coating compositions could not be used, or where their use was accompanied by various disadvantages is disclosed. The curing temperature at which coatings (for example, corrosion resistant coatings) are formed from an aqueous coating composition containing dissolved phosphate, dissolved dichromate, dissolved aluminum, and solid particulate material is lowered by adding diethanolamine to the composition. The coating composition of the present invention can be used to effectively coat substrates which heretofore could not be coated or could not be coated satisfactorily as a result of the substrate being destroyed or degraded by the relatively high temperatures that were required to satisfactorily cure heretofore known coating compositions.

12 Claims, No Drawings

LOW-TEMPERATURE CURING COATING COMPOSITION

This is a divisional of Ser. No. 144,013, filed Apr. 28, 1980, now U.S. Pat. No. 4,319,424 which is a continuation-in-part of now abandoned application Ser. No. 931,674, filed Aug. 7, 1978, which is a continuation of now abandoned application Ser. No. 677,495, filed Apr. 15, 1976, which is a continuation of now abandoned application Ser. No. 441,887, filed Feb. 12, 1974.

FIELD OF THE INVENTION

This invention relates to improved coatings (for example, corrosion resistant coatings) which can be formed by curing an aqueous coating composition at a relatively low temperature. This invention relates also to lowering the curing temperature at which aqueous coating compositions can be cured into coatings having desired properties thereby permitting their use in a wide variety of applications where problems heretofore were encountered.

It is known to apply to metallic and other types of substrates coatings which protect the substrate from corrosive elements, and/or which have other beneficial properties. Some coating compositions which form such coatings must be cured at relatively high temperatures, for example, in excess of 500° F. One type of coating composition that must be cured at relatively high temperatures and that is effective in forming corrosion resistant coatings on various types of substrates is a composition containing dissolved phosphate, dissolved dichromate or molybdate, solid particulate material such as powdered metal, powdered metallic alloys and refractory metal oxides, and optionally, dissolved metal, for example, aluminum, magnesium, sodium, or zinc. Examples of such coating compositions are disclosed in a publication entitled "Investigation of Aluminum Phosphate Coatings for Thermal Insulation of Air Frames", by Eubanks and Moore, National Aeronautics and Space Administration (NASA Technical Note D-106, 1959) and U.S. Pat. No. 3,248,251 to Allen. Coatings formed from the aforementioned type composition have corrosion resistant and/or other beneficial properties depending on the specific solid particulate material used in the composition and the amount applied to the substrate. For example, coatings having particularly high heat resistance or refractory properties can be obtained by utilizing refractory metal oxides such as powdered quartz and alumina ($Al_2O_3$).

Application of the aforementioned type of coatings to articles permits the articles to be used in applications where they otherwise would not be suitable for use or it improves the performance properties of the article. Examples of such properties include corrosion resistance, high heat resistance, abrasion resistance and electrical characteristics. Articles coated with the aforementioned type of coating can be used in various applications, including aerospace, automotive, marine and metal working applications.

One of the steps that is required in forming the aforementioned type of coating on the substrate is curing the coating composition at a relatively high temperature after it has been applied to the substrate. If the composition is not properly cured, problems are encountered. The aforementioned Allen patent discloses that the composition described therein should be cured at a temperature of 500° F. to 1000° F., preferably at 600° F. to 800° F., and that if the composition is not cured completely, soluble ingredients of the coating are leached out when it is exposed to water. This results in a coating having poor moisture resistance. The aforementioned NASA article discloses the curing of compositions described therein at temperatures ranging from room temperature to 800° F. Various of the examples disclosed in the article show that maximum hardness of the coatings is not attained unless the curing temperature is about 600° F., and further that the coatings are not moisture resistant unless cured at a temperature of at least 400° F. for at least one half hour.

In general, if the coating composition is not cured properly, the coating formed therefrom will not have the ability to survive in marine, salt spray, or highly humid environments for desired periods of time.

There are various disadvantages in having to cure the aforementioned coating compositions at such relatively high temperatures. Some types of substrates cannot be coated satisfactorily with the aforementioned type composition because they cannot withstand the high curing temperature, or their properties, such as dimensional stability, and strength, are affected adversely. Another disadvantage is that high energy requirements are needed to provide the high curing temperatures. Also, relatively long periods are needed to cool the hot coated article; this increases processing time, and uses up space which is needed to allow the articles to cool. In coating articles which have areas which should be free of coating, areas such as flanges, threaded surfaces or holes, it is necessary to mask the areas. When applying two or more layers of coatings to such articles, such areas have to be remasked because the high curing temperatures destroy the mask. Appreciable savings in cost and labor could be realized if the coating composition were capable of being cured at lower temperatures which do not destroy the mask. Some industrial concerns have refrained from using the aforementioned type of coating composition because they do not have ovens or furnaces which are capable of providing the high curing temperatures.

This invention relates to a coating composition which is capable of being cured into an improved coating at relatively low temperatures.

REPORTED DEVELOPMENTS

Various methods have been reported for lowering the curing temperatures of the aforementioned type of coating compositions. As will be seen from the discussion which follows, these methods have one or more shortcomings.

In U.S. Pat. No. 3,248,250 to Collins, one of the joint inventors herein, it is disclosed that the curing temperature of the coating composition described in the aforementioned Allen patent can be lowered by adding to the composition an alkali metal silicate. The Collins patent discloses that such compositions can be cured at a temperature as low as 250° F., but preferably at a temperature of 300° F. to 500° F. for 3 to 60 minutes.

In U.S. Pat. No. 3,248,249, also to Collins, it is disclosed that the curing temperature of the coating composition described in the aforementioned Allen patent can be reduced by adding to the composition a solid particulate material having a grain size on the order of 0.1 micron or finer. The preferred particulate materials are colloidal silica and colloidal alumina. The patent discloses that the compositions can be cured at temperatures as low as 250° F., but preferably at temperatures of 250° F. to 500° F. for 3 to 60 minutes.

In general, coatings formed from compositions described in the aforementioned Collins' patents, and cured at the lower temperatures described therein, tend to have better properties than coatings formed from the composition described in the aforementioned Allen patent, and cured at like temperatures. Nevertheless, the use of lower temperatures to cure the compositions described in the Collins' patents results in sacrificing certain desired properties of the coatings formed from the compositions. By way of background, it is noted that for use in certain applications, industrial standards require that coatings of the aforementioned type have excellent adhesive and corrosion resistant properties after being exposed to all of the following 5 test evaluations; (1) 5% salt spray for a minimum of 144 hours; (2) 100% relative humidity at 100° F. for a minimum of 144 hours; (3) hot water (180° F.) for a minimum of 24 hours; (4) steam vapor for a minimum of 144 hours; and (5) hot saline condensates for a minimum of 24 hours. Coatings formed by curing the composition described in the aforementioned Collins' patents at temperatures of 300° F. and below did not pass all of the above tests, with the most predominant failure being that of failure to survive the 5% salt spray test. (For example, after exposing the coated substrate to the 5% salt spray test for a period of only 24 hours, the coating could be wiped off the substrate. Thus, the adhesive properties of such coatings were destroyed when exposed to the salt spray test for a very short period of time.) In general, although certain improvements in corrosion resistance are realized, other important properties, such as abrasion and impact resistance, are affected adversely when the compositions are cured at the lower temperatures.

Thus, it is an object of this invention to provide a coating composition which is capable of being cured at relatively low temperatures, for example, below 400° F. It is another object of this invention to provide a coating composition which is capable of being cured at relatively low temperatures without significantly affecting adversely the desired properties of coatings formed from the composition.

SUMMARY OF THE INVENTION

In accordance with this invention, there is provided an aqueous coating composition comprising, in coating forming proportions: dissolved phosphate; dissolved dichromate; dissolved aluminum; and dispersed solid particulate material, preferably an aluminum-containing material; said composition being capable of being heat-cured at elevated temperatures into a water insoluble material; and further comprising diethanolamine in an amount at least sufficient to reduce the temperature at which said composition can be cured into said water insoluble material.

The addition of diethanolamine to the coating composition is effective in permitting the composition to be cured at temperatures as low as about 180° F. Furthermore, the low-temperature curing composition of this invention can be cured into coatings without significantly sacrificing desired properties of the coatings.

The low-temperature curing composition of this invention provides a number of advantages to industry. It is capable of being cured into coatings at relatively low temperatures without sacrificing desired properties of the coatings. The composition can be used to satisfactorily coat substrates which are not capable of being coated satisfactorily with heretofore known compositions which must be cured at high temperatures which affect properties of the substrate adversely. Since the coating composition can be cured at relatively low temperatures, energy requirements, cool-down time of the coated article, and space required for the cool-down time are reduced. Investment in high-temperature furnaces or ovens is unnecessary. And remasking of coating-free areas of the coated article is avoided because the compositions can be cured at temperatures which do not destroy the mask.

DETAILED DESCRIPTION OF THE INVENTION

The essential ingredients of the aqueous coating composition of this invention are water, dissolved phosphate, dissolved dichromate, dissolved aluminum, solid particulate material and diethanolamine.

The term "dissolved phosphate" as used herein includes $PO_4^{-3}$, $HPO_4^{-2}$ and $H_2PO_4^{-1}$. Any water soluble compound which is a source of dissolved phosphate can be used in preparing the composition of this invention. Examples of such compounds are: ortho, meta, pyro, and hypo phosphoric acids; anhydrous and hydrated metal phosphate salts such as the monobasic phosphates of aluminum, magnesium, zinc, calcium, sodium, potassium and lithium, and dibasic phosphates of magnesium and calcium, and the tribasic phosphates of magnesium, zinc and lithium and mixtures thereof.

The use of orthophosphoric acid is preferred. Excellent results have been attained using this material which is readily available and relatively inexpensive.

Any water soluble compound which is a source of dissolved dichromate ($Cr_2O_7^{-2}$) can be used in preparing the composition of this invention. Examples of water soluble dichromate salts that can be used are sodium dichromate, potassium dichromate and other metal dichromates such as those of magnesium, calcium and zinc. Since the coating composition of the present invention is acidic, chromic acid and its anhydride ($CrO_3$), and water soluble chromate compounds which in acidic medium are oxidized to dichromate can be used also as a source of the dichromate. Examples of metal chromates that can be used are those of potassium, sodium, magnesium, zinc and calcium. The use of chromic anhydride is preferred because its use provides excellent results, it is relatively low in cost and readily available, and it is easier to dissolve than certain other chromium compounds.

The solid particulate materials for use in the composition of the present invention are inorganic materials having a particle size of at least about one micron and include materials such as refractory and non-refractory pigments, including metals, intermetallic or metal alloy compounds, cements, ceramics and fillers. Specific examples of the aforementioned types of particulate materials, which are completely insoluble or substantially insoluble in the aqueous composition, are as follows: metals—aluminum, copper, silver and nickel; intermetallic or metal alloy compounds—cobalt/aluminum alloy and aluminum/manganese alloy; cements—mixed or complex oxides, silicates, silica and zircon; ceramics—metal oxides such as chromic oxide, silica and powdered quartz, aluminum oxide, cerium oxide, zirconia and beryllia, and refractory carbides such as silicon carbide, molybdenum disilicide, tungsten carbide and boron nitride. Examples of other solid particulate materials that can be used are other metal nitrides, metal borides, titanates, zirconates, metal sulfides and graphite.

The particle size of the particulate material can vary over a wide range, and accordingly, can be substantially larger than one micron. Indeed, as to larger particle sizes, any particle size or distribution of particle sizes that permits the binding of the particulate material to the substrate can be used. In general, particle size selection will depend on the type of application for which the coated substrate is to be used. For example, the particle size of the particulate material can be within the range of about 20 to about 100 mesh when it is desired that the coatings have a rough surface for aesthetic or functional reasons. (Unless stated otherwise, the term "mesh" when used herein refers to U.S. Standard Sieve Series.) Smoother coatings can be attained by using a particle size of −200 mesh. For very smooth and denser coatings, it is preferred that the particle size of the particulate material be −400 mesh. It is noted that coatings for gas turbine parts, such as compressor, stator and rotary blades, and for other applications where aerodynamic flow is important, are generally required to be as fine and smooth as possible so that drag is minimized. A particulate material having a particle size within a range of about 1 to about 10 microns can be used to very good advantage in forming coatings on such parts.

The composition can include optionally a material of smaller particle size, for example, colloidal particles, but it is essential that it include a material of larger particle size, as described above.

Selection of the specific particulate material will depend on the specific application for which the coating is to be used. In general, this selection can be made in accordance with known properties of the particulate materials.

The source of the dissolved aluminum can be metal compounds which are soluble in the coating composition. Examples of such compounds are metal oxides, metal hydroxides, and metal carbonates. Other soluble metal compounds and the elemental form of the metal, for example, in powdered form, can be used also. Mixtures of the aforementioned can be used also.

With respect to the amine constituent, it has been found that the addition of diethanolamine to the coating composition reduces hexavalent chromium of the dichromate constituent of the composition to trivalent chromium. This will be discussed more fully in connection with certain of the examples.

As to amounts of ingredients comprising the composition, the dissolved phosphate should be present in an amount such that it functions to form a bond between the substrate and the particulate material.

The dissolved dichromate should be present in amounts such that it inhibits the reaction between the phosphate and the substrate and also the reaction between the particulate material and the phosphate. By way of background, it is noted that if the reaction between the substrate and phosphate is too vigorous, the coating formed tends to be blistered and tends to have poor adhesive properties. Also, if the reaction between the phosphate and the particulate material is too vigorous, the particulate material is consumed by the reaction, and thus, its concentration in the composition is reduced. The amount of dichromate should not be so great that the formation of the phosphate bond is prevented.

The dissolved aluminum should be present in amounts such that appropriate improvements in corrosion resistance and adherency are realized. In general, this occurs at a concentration of about 0.5 mole/liter of aluminum, but the use of higher amounts is preferred, as hereafter noted.

The particulate material should be used in an amount to impart to the substrate a coating of the desired thickness. In general, this will in turn depend on the particular type of application for which the coating is to be used. For example, if the primary function of the coating is to impart electrical conductivity to the substrate, very small amounts of graphite or other conductive material can be used in the composition. On the other hand substantial amounts of the particulate material should be used when it is desired that the coating impart high thermal insulation properties to the substrate. Relatively low amounts of the particulate material can be used in applications (for example, optic and aerodynamic flow applications) where it is desired that the coatings be relatively thin.

As to the amount of diethanolamine, it has been found that the mere presence of the amine appears to be effective in reducing the temperature at which the coating composition can be cured satisfactorily. As to the upper concentration limit of the diethanolamine, this will generally be governed by the effect the amine has on the shelf life of the composition and other factors hereafter discussed. By way of background, it is noted that after the particulate material is mixed with the other ingredients comprising the composition, it will tend to settle from the composition. (The time it takes for the dispersed particulate material to settle will depend on the particular material used and the particle size thereof.) A composition with a good shelf life is one wherein the settled particulate material can be readily re-dispersed in the composition even after standing for long periods of time, for example, many months. Excess amounts of diethanolamine which adversely affect the shelf life of the composition (when shelf life is considered important) should be avoided. Poor shelf life is characterized by the particulate turning into a solid rock hard mass in a relatively short period of time which mass can't be redispersed in the composition. While this is not particularly desirable, such agglomerates can be broken down and the particulate material redispersed in the composition for use by applying high shear.

Also, and as mentioned above, it is believed that the diethanolamine reacts to reduce the hexavalent constituent of the composition to trivalent chromium. This is evidenced by a green color which is observed after the amine is added to the composition. The amount of diethanolamine used should not be so great that the hexavalent chromium ingredient is depleted by this reaction to the extent that its contribution to corrosion resistance is significantly adversely affected.

In general, it will be found that satisfactory coating compositions can be formulated by adding solid particulate material to the following amounts of ingredients.

|  | Amounts, M/l | Preferred Amounts, M/l |
|---|---|---|
| dissolved phosphate | at least about 1 | about 1 to about 6 |
| dissolved dichromate | at least about 0.1 | about 0.15 to about 3.5 |
| aluminum ion | at least about 0.5 | about 1 to about 6 |
| amine | at least about 0.02 | about 0.02 to about 0.3 |

The above aqueous coating compositions of the present invention can be used to form glaze coatings on substrates and the presence therein of the amine is effective in reducing the temperature at which the composition can be cured. It is believed that widest use of the present invention will encompass compositions, as described above, including also about 20 to about 2000 g/l of particulate material. Such compositions can be prepared by standard high shear bulk mixing equipment.

It is believed that the coating composition of the present invention will have its widest applicability of use in coating metallic substrates such as iron and ferrous alloys and other metals which are subject to corrosion or which require a specialty coating due to requirements of use. In addition, the coating composition can be used to coat other types of substrates such as, for example, glass, ceramics, refractories, wood and derivatives thereof, and plastics.

The coating composition can be applied to the substrate according to any available or conventional technique. It is believed that it will be most convenient to apply the composition by conventional procedures used for applying paint, for example, spray, roller and brush. Examples of other techniques for applying the coating composition are electrostatic spray and electrophoretic deposition.

The coated substrate can be cured at temperatures as low as about 180° F. The curing time is dependent on the temperature used and can be best selected on the basis of experience. However, for guideline purposes, when curing at a temperature of about 180° F., the curing should be continued for at least about 4 to 6 hours. When curing at a temperature of about 225° F., the curing should be continued for at least about 1 hour. When curing at higher temperatures, for example, about 300° F. to about 500° F., curing can be continued for about 15 to 30 minutes. It should be understood that due to its inorganic nature, the coating composition of the present invention can be cured at higher temperatures, for example, as high as about 1000° F. to about 1600° F.

In addition to curing the coating composition by exposing it to a heated environment, such as that provided in a hot oven, the composition can be cured also by other methods, examples of which include induction heating, infrared heating and resistance heating.

The thickness of the coating can be varied as desired. For example, the coating can have a thickness within the range of about 0.5 to about 15 mils. Speaking generally, coatings formed from the composition of the present invention will have a thickness of about 0.5 to about 4 mils/coat. For most applications, it is believed that a coating of about 1 to about 2 mils in thickness per coat will be satisfactory. Between each coat the composition should be cured as described above, although shorter time periods may be used for curing between coats.

EXAMPLES

Examples set forth below are illustrative of compositions within the scope of the present invention.

There is described below an aqueous binding solution (Solution A) of the present invention to which can be added solid particulate materials to form coating compositions within the scope of the present invention.

| Solution A | |
|---|---|
| $H_2O$ | 25 ml |
| aluminum phosphate and $CrO_3$ solution* | 100 ml |

| -continued | |
|---|---|
| Solution A | |
| $(HOCH_2CH_2)_2NH$ | 3 g |

*This aluminum phosphate/$CrO_3$ solution was prepared by combining 300 g of hydrated alumina ($Al_2O_3.H_2O$) with 558 ml of 75% phosphoric acid and thereafter high speed mixing. After standing overnight the solution was decanted from the insoluble $Al(OH)_3$ which had settled to the bottom. The resulting solution was diluted with water to yield a 60% by weight aluminum phosphate solution. To 100 ml of this solution, 12 g of ($CrO_3$) was added.

Solution A is an example of an aqueous binding solution that can be described as being versatile in that it can be used very effectively in binding a wide variety of particulate materials, both refractory and non-refractory, to metallic or other substrates. Such coating compositions prepared from Solution A can be cured effectively at relatively low temperatures (for example, at about 180° F. for 4 to 6 hours or at 215° F. for 1 hour or at 300° F. for ½ hour) into coatings which maintain their corrosion resistant properties after being exposed to corrosive environments. Solution A with pigment had no shelf life problem after six months.

Solution A (without particulate material) can be utilized as a glaze type coating, particularly as a top-coat to coatings such as, for example, those described in examples which follow.

Examples 1 to 6 below are illustrative of low temperature curing coating compositions within the scope of this invention, including compositions made from the binding solution described above.

Example 1 is illustrative of a coating composition containing a metal oxide. Such a composition can be used in forming coatings which have properties that make them particularly effective as electrical insulation coatings.

EXAMPLE 1

| Solution A | 100 ml |
|---|---|
| aluminum oxide powder (−400 mesh) | 120 g |

Example 2 is illustrative of a coating composition containing a titanate. Such a composition can be used in forming coatings which have properties that make them particularly effective as thermal insulative coatings with high K factors.

EXAMPLE 2

| Solution A | 100 ml |
|---|---|
| barium titanate (−400 mesh) | 100 g |

Example 3 is an illustration of a coating composition containing a metal alloy.

EXAMPLE 3

| Solution A | 100 ml |
|---|---|
| Aluminum-manganese alloyed metal powder, 50% Al-50% Mn (−325 mesh) | 90 g |

The use of the aluminum-manganese alloy as the particulate material in the coating composition of Example 3 affords various advantages over the use of pure aluminum powder as particulate material. Coatings including the alloy have a higher melting point than coatings including aluminum metal only. The presence of the aluminum in the alloy provides excellent corrosion protection for metal substrates coated with the composition of Example 3 which substrates are exposed alternately to high and low temperatures (for example −100° F. to 1800° F.), and to salt spray environments. (An example of such an application is a coating for hot section parts of gas turbine engines such as turbine blades.) In an application where the coated substrate is exposed to sulphur, such as in applications where the substrate is exposed to sulphur-bearing gases, the manganese in the alloy functions to tie up the sulphur as MnS, thus reducing the susceptibility of the metal substrate to corrosive attack by the sulphur.

Example 4 is illustrative of a coating composition containing metal powder as the particulate material.

EXAMPLE 4

| | |
|---|---|
| Solution A | 100 ml |
| aluminum metal powder (−400 mesh) | 90 g |

Each of the coating compositions of Examples 1 to 4 above was applied to a steel panel by conventional paint spraying equipment. The coating compositions were then cured by placing the coated panels in an oven at 300° F. for 30 minutes. The coatings had thicknesses of about 1 to 2 mils. Thereafter the corrosion resistant properties of coated substrates were evaluated by subjecting the substrates to a 5% salt spray test (ASTM-117B) for 168 hours. It was found that there was no loss of adhesion and the coatings could not be removed readily.

COMPARATIVE EXAMPLES

The coating and test procedure described immediately above was repeated except that the coating compositions used did not contain diethanolamine. (In all other respects the coating compositions of Examples 1 to 4 were the same.) It was found that the coatings after being exposed for only 24 hours to the aforementioned 5% salt spray test were washed off the steel panel or could be readily wiped therefrom. Thus the coatings, formed from the compositions of Examples 1-4, but without the amine, and cured at a relatively low temperature completely lost their bond strength.

In connection with the composition of Example 4 above, part of a steel panel was coated with this composition by spraying. The remainder of the panel was left uncoated. The partly coated panel was cured at 350° F. for 30 minutes. In addition to exhibiting excellent adhesion to the steel panel after 168 hours exposure to the aforementioned 5% salt spray test, the coating exhibited excellent sacrificial corrosion protection, that is, it was responsible for inhibiting corrosion of the uncoated portion of the panel. Sacrificial corrosion protection of this type is generally considered to be dependent on the conductivity of the coating's metal particulate material, which normally is above the metal comprising the substrate in the electromotive series of metals, that is, the particulate material is more anodic than the base metal. However, in this case, the coating was found not to be conductive before or after exposure to the salt spray environment.

OTHER EXAMPLES OF THE INVENTION

Example 5 below is illustrative of a coating composition containing a mixture of different solid particulate materials.

EXAMPLE 5

| | |
|---|---|
| Solution A | 125 ml |
| silica (quartz, −325 mesh) | 200 g |
| $Cr_2O_3$ (−325 mesh) | 15 g |

The coating composition of Example 5 can be cured into a refractory coating which has excellent high temperature thermal insulative properties. The coating has satisfactory hardness and strength after being cured on a steel substrate at temperatures of 215°-300° F. for one half hour. It has been found that when the coated steel substrate is subjected to use in applications where it is subjected to temperatures as high as 1800° F., the coating continues to increase in hardness and has very high resistivity values, for example, $2.2 \times 10^6$ ohm-cm at 1800° F. and $300 \times 10^6$ ohm-cm at 1200° F.

Example 6 is illustrative of a particularly good ceramic coating composition.

EXAMPLE 6

| | |
|---|---|
| water | 70 ml |
| phosphoric acid, 75% | 30 ml |
| zinc chromate | 5 g |
| aluminum hydroxide | 20 g |
| lithium carbonate | 5 g |
| sodium dichromate | 20 g |
| diethanolamine | 3 g |
| quartz, −325 mesh | 150 g |
| chromic oxide, −325 mesh | 5 g |

The composition of Example 6 illustrates the use of dissolved aluminum in admixture with other metals in dissolved form, namely zinc, lithium, and sodium. It is noted hereinabove that prior art compositions include dissolved metal. For example, aforementioned U.S. Pat. No. 3,248,251 to Allen discloses the use of aluminum, as well as the use of one or more of the following: magnesium; calcium; zinc; ferric iron; lithium; sodium; and potassium. The composition of the present invention can include one or more of such metals in dissolved form in combination with dissolved aluminum, with the total dissolved metal concentration being no greater than about 6 moles/liter and the concentration of dissolved aluminum being at least about 0.5 mole/liter, preferably at least about 1 mole/liter.

In summary, it can be said that the present invention affords a number of important industrial advantages. The coating composition of the present invention can be used in a wide variety of applications under conditions where energy requirements are reduced and excellent coating properties are realized.

We claim:

1. In a method for coating a substrate comprising applying to said substrate an acidic aqueous coating composition comprising in coating-forming proportions, materials which are a source of: dissolved phosphate; dissolved dichromate; dissolved aluminum; and inorganic solid particulate material having a particle size of at least about one micron and capable of being bonded to a metallic surface by phosphate bonding;

wherein said composition is capable of being heat-cured at elevated temperature within a pre-determined time into a water insoluble coating in which particulate material of the coating is phosphate bonded to said surface; the improvement comprising including diethanolamine into said composition in an amount sufficient to reduce the temperature at which said composition can be cured within said predetermined time into said water insoluble coating; and thereafter curing said composition into said coating.

2. A method according to claim 1 wherein said composition is cured at a temperature of at least about 180° F.

3. A method according to claim 1 wherein said composition is cured at a temperature of about 215° F. to about 300° F.

4. A method according to claim 1 wherein said composition is cured at a temperature of about 180° F. to about 225° F. for one to about six hours.

5. A method according to claim 1 wherein said substrate is a ferrous alloy.

6. A method for coating a metallic substrate comprising applying to said substrate an acidic aqueous coating composition consisting essentially of ingredients which are a source of the following materials, in amounts equivalent to:
   (A) at least about 1 M/l of dissolved phosphate;
   (B) at least about 0.1 M/l of dissolved chromate;
   (C) at least about 0.5 M/l of dissolved aluminum;
   (D) at least about 20 g/l of inorganic solid particulate material having a particle size of at least about one micron and capable of being bonded to a metallic surface by phosphate bonding; and
   (E) at least about 0.02 M/l of diethanolamine; and curing said composition at elevated temperature into a water insoluble coating in which particulate material of the coating is phosphate bonded to said surface.

7. A method according to claim 6 wherein said composition consists essentially of:
   (A) about 1 to about 6 M/l of dissolved phosphate;
   (B) about 0.15 to about 3.5 M/l of dissolved dichromate;
   (C) about 1 to about 6 M/l of dissolved aluminum;
   (D) about 20 to about 2000 g/l of said particulate material; and
   (E) about 0.02 to about 0.3 M/l of diethanolamine.

8. A method according to claim 7 wherein the source of said dissolved phosphate is orthophosphoric acid and the source of said dissolved dichromate is chromic anhydride ($CrO_3$).

9. A method according to claim 8 wherein said particulate material is aluminum or aluminum oxide.

10. A method according to claim 6 wherein said coating composition consists essentially of:
    (A) phosphoric acid in an amount equivalent to at least about 1 M/l of dissolved phosphate;
    (B) chromic anhydride in an amount equivalent to at least about 0.1 M/l of dissolved dichromate;
    (C) at least about 20 g/l of aluminum metal powder, the particle size of which is -400 mesh (U.S. Standard Sieve Series);
    (D) at least about 0.5 M/l of dissolved aluminum; and
    (E) at least about 0.02 M/l of diethanolamine.

11. A method according to claim 10 wherein the ingredients are present in amounts equivalent to:
    (A) about 1 to about 6 M/l of dissolved phosphate;
    (B) about 0.15 to about 3.5 M/l of dissolved dichromate;
    (C) about 20 to about 2000 g/l of aluminum metal powder;
    (D) about 1 to about 6 M/l of dissolved aluminum; and
    (E) about 0.02 to about 0.3 M/l of said amine.

12. A method according to claim 11 wherein the composition includes also one or more of the following metals in dissolved form: magnesium, zinc, calcium, sodium, and potassium.

* * * * *

UNITED STATES PATENT AND TRADEMARK OFFICE
CERTIFICATE OF CORRECTION

PATENT NO. : 4,381,323

DATED : April 26, 1983

INVENTOR(S) : J. Lowe, J. Klotz and G. Collins, Jr.

It is certified that error appears in the above—identified patent and that said Letters Patent is hereby corrected as shown below:

Title page at [75]   [75] should read: James M. Klotz, Quakertown, Pa., and Glenn A. Collins, Jr., deceased, late of Lansdale, Pa., by Jean C. Lowe, Executrix.

Col. 12, line 39   After "calcium," insert --lithium,--.

Signed and Sealed this

Fourth Day of December 1984

[SEAL]

Attest:

GERALD J. MOSSINGHOFF

Attesting Officer   Commissioner of Patents and Trademarks